J. HETTRICH.
CORN HARVESTER.
APPLICATION FILED SEPT. 21, 1908.
917,606.
Patented Apr. 6, 1909.
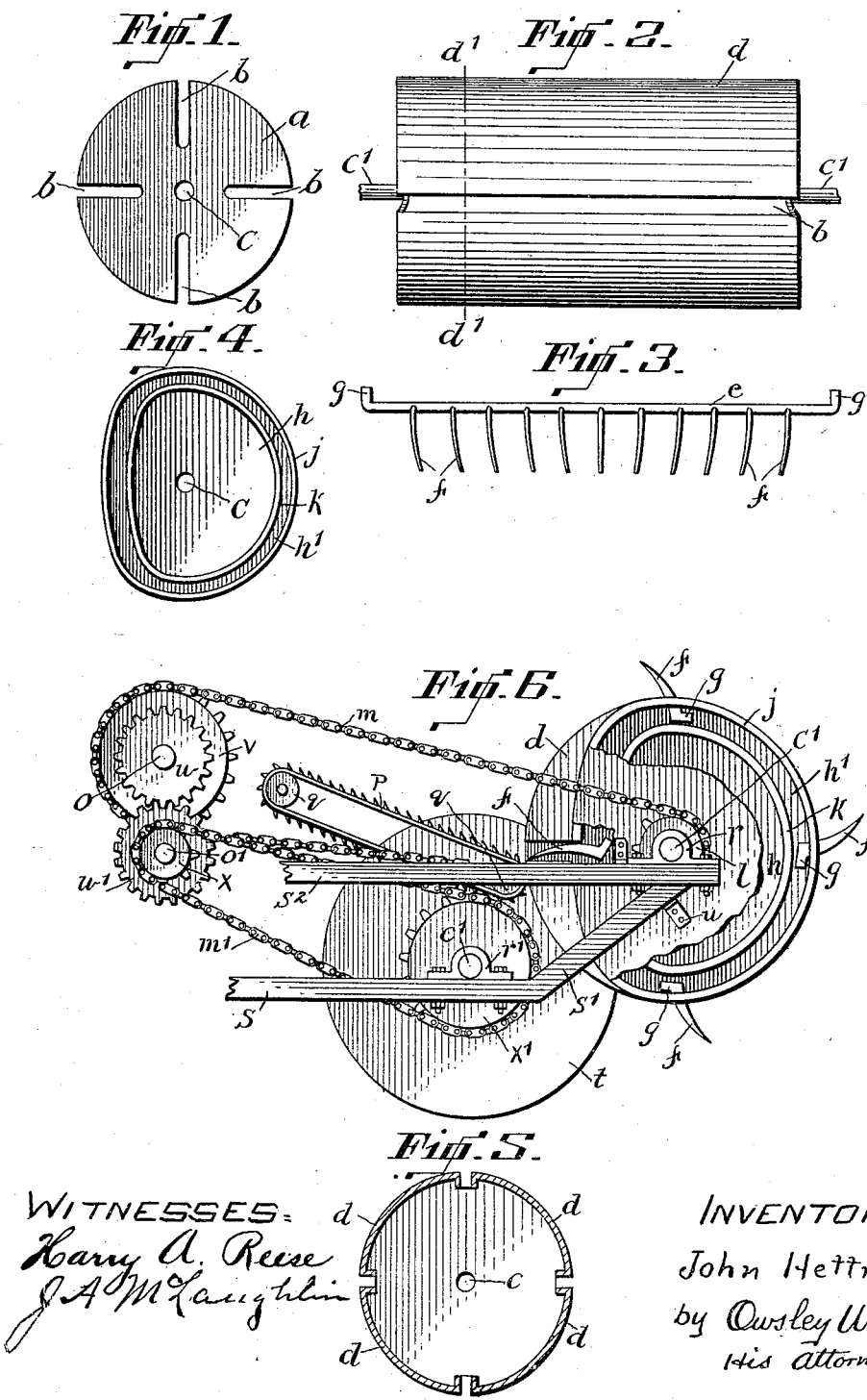
WITNESSES:
Harry A. Reese
J. A. McLaughlin
INVENTOR:
John Hettrich,
by Owsley Wilson,
His Attorney.

UNITED STATES PATENT OFFICE.

JOHN HETTRICH, OF GRAND ISLAND, NEBRASKA.

CORN-HARVESTER.

No. 917,606.      Specification of Letters Patent.      Patented April 6, 1909.

Application filed September 21, 1908. Serial No. 454,117.

*To all whom it may concern:*

Be it known that I, JOHN HETTRICH, a citizen of the United States, and a resident of Grand Island, in the county of Hall and State of Nebraska, have invented a new and useful Improvement in Corn-Harvesters, of which the following is a specification sufficiently clear to enable those skilled in the art to which it appertains to make and use the same.

The purpose of my invention is:—to provide a corn-husker which will gather the corn from the stalk as it stands in the field and deliver the same upon the elevator of the machine regardless of irregularities in size, weight and shape of the ears without dropping corn between the elevator and the gatherer and which will handle without loss any kind of corn from popcorn to the largest ears.

The point of novelty consists in a cylindrically shaped gatherer equipped with automatically operating fingers which withdraw within the cylinder to discharge the corn and pass the elevator and are immediately thereafter projected practically their entire length outside the drum in position for gathering thus permitting practically the entire length of the fingers to be utilized in gathering the corn and also permitting the cylinder, or drum, to work close to the elevator, doing away with the space and openings between other gatherers and the elevator and the uncertain delivery of irregular ears common thereto, the high speed required to throw over such spaces, and adjustments necessarily incident thereto in different kinds of corn, also in simplicity of construction, light weight, light draft and durability of my corn harvester over all others.

Reference is to be had to the accompanying drawings which form part of this specification and in which similar characters of reference indicate corresponding parts in all the figures.

Figure 1, represents an end view of the gathering drum, or cylinder. Fig. 2, represents a side view of the gathering drum. Fig. 3, represents a horizontal view of my gatherer finger bar with fingers and guides thereon. Fig. 4, represents an inner face view of my cam. Fig. 5, represents a vertical cross-sectional view of my cylinder or drum taken on the plane of the dotted line "$d$" "$d$". Fig 6 represents a side view of my gatherer fully mounted and equipped on and showing portions of a husking machine.

In Fig. "6" the references "$s$", "$s^1$", and "$s^2$" represent portions of the frame of a corn-husker; "$t$" the supporting and in the absence of other power the drive wheel, "$c^1$" represents the shaft of said carrying wheel; "$x^1$" represents a sprocket wheel on said drive wheel; "$m^1$" a chain belt connecting drive wheel sprocket with sprocket "$x$" on machine shaft "$o^1$"; "$w^1$" represents a spur gear wheel meshing with a like gear wheel "$w$" on shaft "$o$"; "$v$" represents a sprocket wheel on shaft "$o$" connected with sprocket "$l$", on gatherer shaft "$c^1$" by chain belt "$m$"; "$p$" represents a corn elevator on machine for carrying corn from the gatherer to husking rolls or other parts of the husker desired to first receive the same; "$d$" represents the cylinder, or drum of the gatherer; "$h$" represents a gatherer cam; "$h^1$" represents a trackway in said cam to receive the finger bar guides "$g$", (Fig. 3); "$j$" represents the outer and "$k$" the inner projections, sides or shoulders of said cam track way; "$f$" represents the fingers or gatherer teeth in working position with one tooth withdrawn within the cylinder for discharge and to pass the elevator as shown in "Fig. 6"; "$l$" represents the gatherer shaft; "$r$" boxing for gatherer shaft; "$u$" represents brackets attaching cam to machine frame.

I make my gatherer with a cylindrical shaped drum "Fig. 2", which I make of suitable sheet metal with the surface thereof provided with longitudinal openings its entire length, I recommend a series of four openings though the number may be successfully varied, said openings are of uniform distance from each other and are for the reception of the finger-bars and fingers or teeth. Each end of said cylinder, or drum is made with a head, (Fig. 1) attached thereto, which head I make with a plurality of radial slits corresponding and connected with the longitudinal openings in the cylinder, each slit extending from the outside in line with and three fifths the length of the radius of the head for the purpose of guides for the finger bars. I make the heads preferably of strong sheet metal and reinforce the sides of the said slits with strips of heavier metal for the purpose of strengthening same and decreasing wear on the finger bars. I also provide an aperture in the center of each cylinder head to receive the cylinder shaft "$c^1$" which aperture I strengthen with a heavy metal collar whereby the drum is attached by key or set screw to the gatherer shaft.

I make a cam for each end of the gatherer drum which cam I make of the same size as said drum excepting one side which is flattened as shown in Figs. 4 and 6. I make said cams rights and lefts, otherwise alike, and made preferably of heavy sheet metal to which I attach an outer and an inner shoulder, "$j$" and "$k$", Fig. 6, of angle iron so as to leave a trackway "$h^1$" entirely around the inner surface of each cam, in its circular portion the trackway is just wide enough to receive comfortably the finger-bar guides and permit them free movement lengthwise the track way so as to hold the finger bar and the fingers thereon rigidly in position while the guides of the finger bar are in that portion of the cam track. In the flattened portion of the cam track I make the said track way gradually wider each way from the circular portion so as to permit the finger-bar guides to tilt in said trackway and accommodate themselves to a slanting position therein as the curved fingers are retracted into the cylinder and again projected therefrom. I provide an aperture "$c$" in each cam to freely allow the drum shaft "$c^1$" to pass through same and solidly bolt each cam to its respective side of the machine frame by the metal brackets "$u$" in the position facing and parallel to each other at each end of the drum heads, after first having inserted a finger bar in each longitudinal opening therefor in said cylinder and after the guide ends of each finger-bar have been placed in their proper position in said cam trackway as shown in Fig. 6. I then attach the sprocket wheel "$l$" to the cylinder shaft and mount the ends of said cylinder shaft in the boxing "$r$" on the machine frame and connect the cylinder sprocket "$l$" with the sprocket "$v$", having power connections, on the machine by means of the chain belt "$m$".

In use the guide slits in the drum heads hold each finger-bar in its own radial track and cause the finger bars and fingers thereon to revolve with the drum, the finger-bar guides on the ends of each finger bar move through the stationary cam track and are held rigid in the narrow portion thereof, where they snugly fit the said track way, and hold the sets of gathering fingers erect and projecting from the surface of the gatherer drum in position for gathering corn; as the finger-bar guides enter the flattened portion of the cam track way the finger-bars are withdrawn into the cylinder with the fingers thereon and the widened portion of the cam trackway permits the finger bar guides to tilt and accommodate themselves to a slanting position necessitated by the withdrawing into the cylinder of the curved fingers and gradually straighten in the cam trackway as the fingers are again projected as shown in Fig. 6, thus the fingers are held erect for gathering the corn except when withdrawn to deliver the same on the elevator and to pass the elevator and immediately thereafter are again projected from the surface of the drum where they are held in gathering position until as they complete the revolution with the drum they are again withdrawn for delivery, the revolving cylinder causes the fingers to revolve with the cylinder, the finger bar guides on ends of each fingerbar working in the stationary cam track causes the fingers to withdraw as they approach the elevator discharging their load on the elevator and permits the drum to work close to the elevator as shown in Fig. 6.

The utility of my gatherer is at once apparent.

Having thus described my invention, what I claim as new and desire to secure by Letters Patent is:—

1. In a corn harvester, or like machine, a gatherer consisting of a central shaft, a cylindrical shaped drum provided with a plurality of longitudinal openings lengthwise the cylinder of uniform distance apart and parallel to each other, on each end of the cylinder a head provided with slits corresponding in number and connecting with the longitudinal openings in the cylinder, each of which slits extends from the outside of the cylinder head in line with and three fifths the length of the radius of said head, a plurality of finger bars each finger bar slightly longer than the cylinder, a straight metal finger bar guide attached to the ends of each fingerbar so that the finger bar guides on each finger bar project at right angles therefrom in the same direction and parallel to each other, a plurality of curved fingers attached to each fingerbar, parallel to each other and equal distances apart and extending from said fingerbar at approximately right angles from the said fingerbar guides, a cam at each end of said drum having a circular portion and a flattened portion said cams being rights and lefts otherwise made alike with recessed cam track just wide enough in its circular portion to allow the finger bar guides to freely slide lengthwise therein and in the flattened portion of said cam track gradually widened to permit the finger bar guides to tilt and accommodate themselves to the withdrawal of the curved fingers, then gradually narrowed as the fingers are again projected, means of attaching said cams solidly to the machine frame at each end of the drum positioned parallel and in opposition to each other.

2. In a corn harvester, the combination with a frame, a gatherer mounted to revolve in the frame, said gatherer composed of a central shaft, a cylindrically shaped drum with a plurality of longitudinal openings parallel to each other and of equal distance apart in the cylinder thereof, a head attached to each end of said cylinder, a plurality of slits in each head corresponding and connected with the longitudinal openings in the said cylinder and extending from the outer side of each head in line with and three fifths the length its radius, means of attaching said drum to said drum shaft, a plurality of fingerbars each slightly longer than said cylinder, a straight metal finger bar guide attached to the ends of each fingerbar so as to project at right angles therefrom in the same direction and parallel to each other, a plurality of curved fingers attached to each finger bar, parallel to and of equal distance apart and extending from said fingerbar at right angles from the fingerbar guides, a cam for each end of said drum but independent thereof, the said cams being rights and lefts otherwise made alike with a recessed cam track having a circular portion and a flattened portion, the said cam track being just wide enough in its circular portion to allow the finger bar guides to slide freely lengthwise therein the said cam track gradually widened in its flatter portion to permit the fingerbar guides to tilt and accommodate themselves to the withdrawal of the curved fingers then gradually narrowed again to its uniform width in the circular portion of said track, means of attaching said cams immovably to the machine frame at each end of the cylinder positioned facing and parallel to each other and close to the ends of said cylinder.

3. In a corn harvester or like machine the combination with a frame and a gatherer composed of a shaft mounted to revolve in said frame, a cylindrically shaped drum attached to said shaft, longitudinal openings of equal distance apart in the surface of said drum, radial openings in the heads of said drum connecting with said longitudinal openings in said drum and extending approximately three fifths the length of the radius of said drum heads, a fingerbar for each longitudinal opening in said drum, a fingerbar guide on the end of each fingerbar and extending therefrom in the same direction and at right angles to said fingerbar, a series of curved teeth attached to and extending from each fingerbar at approximately right angles to said finger bar guides, a cam for each end of said drum made rights and lefts otherwise alike with a central aperture for the gatherer shaft and with a recessed cam track having a circular portion and a flattened portion, the said cam track just wide enough in its circular portion to allow the fingerbar guides to slide freely lengthwise therein and gradually widened and again diminished in the flattened portion of the cam orbit to permit the finger bar guides to tilt as the curved fingers are retracted and again projected, means for attaching said cams solidly to the machine frame at each end of the cylinder, parallel to and in opposition to each other.

4. In a corn harvester or like machine the combination with a frame, an elevator, a source of power and a corn gatherer, which corn gatherer is composed of a shaft mounted to revolve in said frame, a cylindrically shaped drum attached to said shaft, longitudinal openings of equal distance apart in the cylindrical face of said drum, radial openings in the heads of said drum each radial opening connecting with a longitudinal opening in said cylinder and extending from the outside three fifths the length of the radius of said heads, a finger bar for each longitudinal opening in said drum, a guide on each end of each fingerbar projecting therefrom in the same direction and at right angles from said fingerbar, a series of curved fingers attaching to and extending from said fingerbar at approximately right angles to said fingerbar guides, a cam for each end of said cylindrically shaped drum but independent therefrom, said cams being rights and lefts otherwise made alike with a recessed cam track having a circular portion and a flattened portion, the said cam tracks being wide enough in its circular portion to comfortably receive the said fingerbar guides and permit same to slide freely lengthwise therein the said cam track being gradually widened and again diminished in its flattened portion to permit the fingerbar guides to tilt as the curved fingers are retracted and again projected, means of attaching said cams solidly to the machine frame at each end of the cylinder parallel and in opposition to each other, means of connecting said gatherer with power, all substantially as described and set forth herein.

In testimony whereof, I have signed my name to this specification in the presence of two subscribing witnesses.

JOHN HETTRICH.

Witnesses:
A. O. ZOOK,
L. A. RICKETTS.